US006834344B1

(12) United States Patent
Aggarwal et al.

(10) Patent No.: US 6,834,344 B1
(45) Date of Patent: Dec. 21, 2004

(54) SEMI-FRAGILE WATERMARKS (75) Inventors: Gaurav Aggarwal, New Delhi (IN);
Pradeep K. Dubey, New Delhi (IN);
Ashutosh Kulshreshtha, New Delhi
(IN); Marco Martens, Chappaqua, NY
(US); Charles P. Tresser, Mamaroneck,
NY (US); Chai W. Wu, Poughquag,
NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/398,203

(22) Filed: Sep. 17, 1999

(51) Int. Cl.[7] ............................................. H04L 9/00
(52) U.S. Cl. .................. 713/176; 713/176; 713/168; 713/180; 713/170; 713/173; 713/179; 382/100; 382/232; 382/210; 382/252; 382/287; 382/54
(58) Field of Search ......................... 713/176; 380/203, 380/232, 100

(56) References Cited

U.S. PATENT DOCUMENTS

| | | | |
|---|---|---|---|
| 5,907,619 A | | 5/1999 | Davis |
| 6,246,777 B1 | * | 6/2001 | Agarwal et al. ............ 382/100 |
| 6,427,020 B1 | * | 7/2002 | Rhoads ....................... 382/100 |
| 6,496,591 B1 | * | 12/2002 | Rhoads ....................... 382/100 |
| 6,512,837 B1 | * | 1/2003 | Ahmed ....................... 382/100 |
| 6,574,350 B1 | * | 6/2003 | Rhoads et al. ............. 382/100 |
| 6,611,599 B2 | * | 8/2003 | Natarajan .................. 380/203 |
| 2003/0070075 A1 | * | 4/2003 | Deguillaume et al. ...... 713/176 |

FOREIGN PATENT DOCUMENTS

| | | |
|---|---|---|
| EP | 0855681 | 7/1998 |
| EP | 0947953 A2 | 10/1999 |
| EP | 0967803 A2 | 12/1999 |
| GB | 2348071 A | 8/2000 |
| WO | WO 99/17537 | 4/1999 |
| WO | WO 00/39954 | 7/2000 |

OTHER PUBLICATIONS

United Kingdom Office Action, dated May 23, 2001.
F. Mintzer, G. W. Braudaway and M. M. Yeung, "Effective and Ineffective Digital Watermarks", *Image Processing*, vol. 3, Oct. 1997, pp. 9–12.
J. Fridrich, "A Hybrid Watermark for Tamper Detection in Digital Images", *Signal Processing and its Applications*, vol. 1, Aug. 1999, pp. 301–304.
M. Kutter et al., "Towards Second Generation Watermarking Schemes"; IEEE999, pp 320–323.

* cited by examiner

*Primary Examiner*—Ayaz Sheikh
*Assistant Examiner*—Syed A. Zia
(74) *Attorney, Agent, or Firm*—Whitham, Curtis & Christofferson, P.C.; T. Rao Coca (57) ABSTRACT

A method is presented for marking high-quality digital images with a robust and invisible watermark. It requires the mark to survive and remain detectable and authenticatable through all image manipulations that in themselves do not damage the image beyond useability. These manipulations include JPEG "lossy" compression and, in the extreme, the printing and rescanning of the image. The watermark also has the property that it can detect if the essential contents of the image has changed. The first phase of the method comprises extracting a digest or number N from the image so that N only (or mostly) depends on the essential information content, such that the same number N can be obtained from a scan of a high quality print of the image, from the compressed form of the image, or in general, from the image after minor modifications (introduced inadvertently by processing, noise etc.). The second phase comprises the marking. This can be done in form of an invisible robust watermark, or in form of some visible signature or watermark.

28 Claims, 8 Drawing Sheets

SEMI-FRAGILE WATERMARKS

CROSS-REFERENCE TO RELATED APPLICATIONS

This application is related to co-pending application Ser. No. 09/397,503, titled Method and apparatus for producing duplication and imitation-resistant identifying marks on objects, and duplication and imitation-resistant objects, filed Sep. 17, 1999; Ser. No. 09/398,029, titled Method and system for secure sale of electronic tickets, filed September 17. 1999 (abandoned); Ser. No. 09/398,028 titled Method and system for remote printing of duplication resistant documents, filed Sep. 17, 1999 (abandoned); and Ser. No. 09/398,025 titled Method and system for vouch-saving electronic originals filed Sep. 17, 1999, and all herein incorporated by reference.

BACKGROUND OF THE INVENTION

1. Field of the Invention

The present invention generally relates to digital watermarks and, more particularly, to semi-fragile digital watermarks which survive incidental modifications to an attached file caused by, for example, noise, compression-decompression, or digital to analog to digital (D/A/D) conversion of the file, which do not effect the authenticity of the file.

2. Description of the Related Art

The invention is directed to imperceptible watermarking of images. We define an imperceptible watermark (hereinafter simply "watermark"), as an alteration of the data set which is for the most part, imperceptible to a human (i.e., the watermark should be invisible or almost invisible), but can be recognized by a machine such as a computer. The general principle of such watermark has been disclosed, for instance in M. M. Yeung et al., "Digital Watermarking for High-Quality Imaging", Proceedings of the IEEE Signal Processing Society Multimedia Workshop, Princeton, N.J., 1997.

Here we are interested in fragile watermarks, by which we mean watermarks which allow a system to recognize that an image is authentic and has not been altered, rather than in robust watermarks which are mainly devoted to establish ownership. As the invention relates to these two different types of technologies, we first review them at the level of detail and generality needed to describe the invention.

Fragile watermarks are designed to ensure that an image has not been modified. The principle is that if the image has been modified, the watermark alerts to this fact, and to some extent can localize where this modification has been done. Watermarks are usually based on some cryptographic techniques, and either secret or public keys can be used. In the current use of fragile watermarks, it is assumed that the image is always digital, by which we mean that it is kept and circulated as a file of numbers, and visualized and manipulated using a digital machine such as a computer. Fragile watermarks can be created and detected in several formats, compressed and/or uncompressed. As long as the image is kept in numerical form, data can be hidden in the file and retrieved by appropriate algorithms. The same image may be printed or reinterpreted with an analog machine, but it is not expected that the watermark be accessible after this transfer has been done.

It is often argued that fragile watermarks can be replaced by digital signatures, because all the scenario of creation and detection takes place at the digital level. However, a digital signature is an integer number that is obtained by a digital signature algorithm applied on a number associated in some prescribed way to the image, and is mainly used to authenticate the origin and integrity of the message or image whereas, digital watermarks are data hidden in, or more generally modifying, the pixels of the image file. On the other hand, watermarks can have many uses, including, but not limited to integrity verification. For example, robust watermarks are used for claiming ownership.

Robust watermarks are designed to survive modifications of the image, and more precisely, to remain detectable when the image has been modified to some reasonable extent. Robust watermarks are usually required to be non-removable by an adverse party. They can be designed to establish ownership, or to help protecting copyrights. In several cases, one expects them to still be detectable when the image is transferred to the analog world (prints or analog signals). The argument that watermarks can be replaced by signatures does not hold in this context, as known signature schemes do not resist transfer from the digital to analog world. Because of the dual constraint of invisibility and resistance, robust watermarks detection is based on statistical analysis. That is, any individual components of a mark can be altered by attack and/or by digital/analog (or D/A) conversion so that one is reduced to check that traces of the overall mark subsist. In general terms, one can say that a robust watermark consists in a mask M(K) defined by a cryptographically designed key K: the mask is used to modify some pixels attributes according to some algorithm, which defines the modification m(i, j) of the pixel (i, j)'s attributes as a function of the mask M, the pixel's attribute before marking A(i, j), and the attributes before marking Av(i, j) of neighboring pixels, i.e., $$m(i, j)=F(M(K), A(i, j), Av(i, j))$$

Because the image and the accompanying watermark are expected to suffer some modifications, the key K is usually chosen as a secret key.

It would be quite advantageous to be able to reap the benefits of both fragile and robust invisible watermarks, and more precisely to have imperceptible watermarks for originality check which are fragile enough to detect significant modifications of the image, yet can still be detected to authenticate the image after minor modifications or modifications which may be significant but whose statistical properties are known or can be found through experimentation, such as printing and scanning, compression/decompression and/or high quality D/A/D conversion.

SUMMARY OF THE INVENTION

It is therefore an object of the present invention to provide a semi-fragile watermark which is robust enough to provide an originality check but which is fragile enough to detect only significant modifications of the image.

It is yet another object of the present invention to provide a semi-fragile watermark which is substantially imperceptible by a human and can survive digital to analog and back to digital conversion.

It is yet a further object of the present invention to provide a semi-fragile watermark which can authenticate an image after modifications which may be significant but whose statistical properties are known or can be found through experiments, such as printing and scanning, compression/decompression and/or high quality D/A/D conversion.

According to the invention the benefits of robust watermarks (resistance to small modifications) with the benefits of fragile watermarks (detection of tampering of content) are combined.

Here we distinguish between minor modifications which are acceptable and/or unavoidable modifications to the image for which the modified image is still considered authentic and significant modifications which are modifications of the intended information content of the image. For instance, in the case when fragile watermarks are used to control that a picture of a car has not been modified, the intended information is the nature of the damages or the quality of the repairs. Suppose the modification due to, say, printing and scanning, changes the colormap of the image. We know statistically how the colormap would generally change, and so we do not use this component of image in producing the watermark. Thus the image after printing and scanning defines a number which, once coded, defines the same watermark.

A digital signature is a number that is obtained by encrypting a message or image through a digital signature algorithm and is mainly used to authenticate the integrity of the message or image. Digital watermarks are data added to the pixels of the image file. On the other hand, watermarks can have many uses, including, but not limited to integrity verification. For example, robust watermarks are used for claiming ownership. The present invention is to combine the benefits of robust watermarks (resistance to small modifications) with the benefits of fragile watermarks (detection of tampering of content).

One aspect of the present invention is that digital signature schemes do not have the same benefits as the proposed semi-fragile watermarking scheme since they cannot authenticate the image after lossy compression or printing and scanning. Also disclosed is how a visible signature, possibly computed using a public digital signature scheme such as Rivest-Shamir-Adleman (RSA), is attached to an image which can authenticate the image after minor and acceptable modifications. Anyone versed in the art would readily understand how the present invention adapt as well to sound tracks and to audio visual video recordings. The marking is performed in two phases:

1. The first phase comprises extracting a digest or number N from the image so that N only (or mostly) depends on the essential information content, such that the same number N can be obtained from a scan of a high quality print of the image, from the compressed form of the image, or in general, from the image after minor modifications (introduced inadvertently by processing, noise etc.).
2. The second phase comprises the marking per se. This can be done in the form of an invisible robust watermark, or in form of some visible signature. The visible signature can be placed in an unobtrusive manner on the image, e.g., in the first few rows of the image pixels in a variety of machine readable formats such as bar codes, an alternation of very clear and very dark pixels, or optical character recognition (OCR) fonts. In the first case, using some cryptographic key K, one chooses a mask M(K(N)) constructed according to some preferred method of robust invisible watermarking. Because of the statistical nature of robust watermarks discussed earlier, the key K, or at least part of it, must be secret. In the second case, since the detection of the signature is easy, one can use a public key signature scheme. In either case, the watermark should alter the image in a minor way such that the essential information content is not changed. In particular, the number N extracted from the watermarked image should be the same (or almost the same) as the number extracted from the un-watermarked image: for instance, if visible unobstructive signature is used, one would not consider the information from the area where the signature will be displayed in the determination of N. The use of private key/public key (SK/PK) pairs and of secret encoding keys are now well known: a description of these techniques with directions on how to use several of their implementations can be found for example in Alfred J. Menezes et al, Handbook of Applied Cryptography", CRC Press, 1997. For definiteness, each time we use a public encryption scheme, one can choose the RSA protocol, described in U.S. Pat. No. 4,405,829, as a method to generate and use a SK/PK pair in order to allow for public digital signature: several other methods could also be used (see, e.g., the "Handbook of Applied Cryptography").

Notice that when the signature computed from N is displayed in a way that allow exact recovery, instead of a mean to compute exactly N each time, it is enough to use a method that allows a system to ensure that a number close enough to N (where close enough depends on applications) will be recovered at the time of verification: more precisely, using a public signature scheme, one can recover the original N from the signature, and then compare this original N, computed at the time watermarking is performed, to the value computed at the time one performs the verification.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The watermarking process is performed in two phases. In the first phase, a number N is associated with the image I so that N is insensitive to some minor and/or statistically known modifications of I. We present two methods to accomplish such a computation of a number N=F(I) where F denotes the function which computes N from I. Note that in general, because of the nature of N, the function F is not one-to-one. The first method for calculating N decomposes the image into two orthogonal parts, one of which is immune to minor or benign modifications. The second method is based on quantizing transform coefficients which is more suitable for application environments where the images are stored in a compressed form.

In the first method for calculating N, only that component of the image which is not modified by a known modification is used in the calculation. To determine known modifications (i.e., benign modifications), a class of images which is a representative subset of the possible minor modifications which can occur to the image is constructed. Thereafter, the image is decomposed into two components using the statistical properties of the changes in the image due to these known modifications. One component is where these known modifications occur, and the other component is orthogonal to this component. Thus when the image is subjected to these known modifications, the orthogonal component is not changed. The number N=F(I) is then derived from the orthogonal components of the image, e.g., N can be a hash of the bit stream comprising the bits in the orthogonal component. The data N is then stored on the image by a robust invisible watermark or other robust data hiding algorithms. An example of such robust invisible watermark is disclosed in U.S. Pat. No. 5,825,892 to Mintzer and Braudaway, herein incorporated by reference. The invisibility of the watermark is such that the orthogonal component is not changed by the insertion of the watermark.

Figure 1:
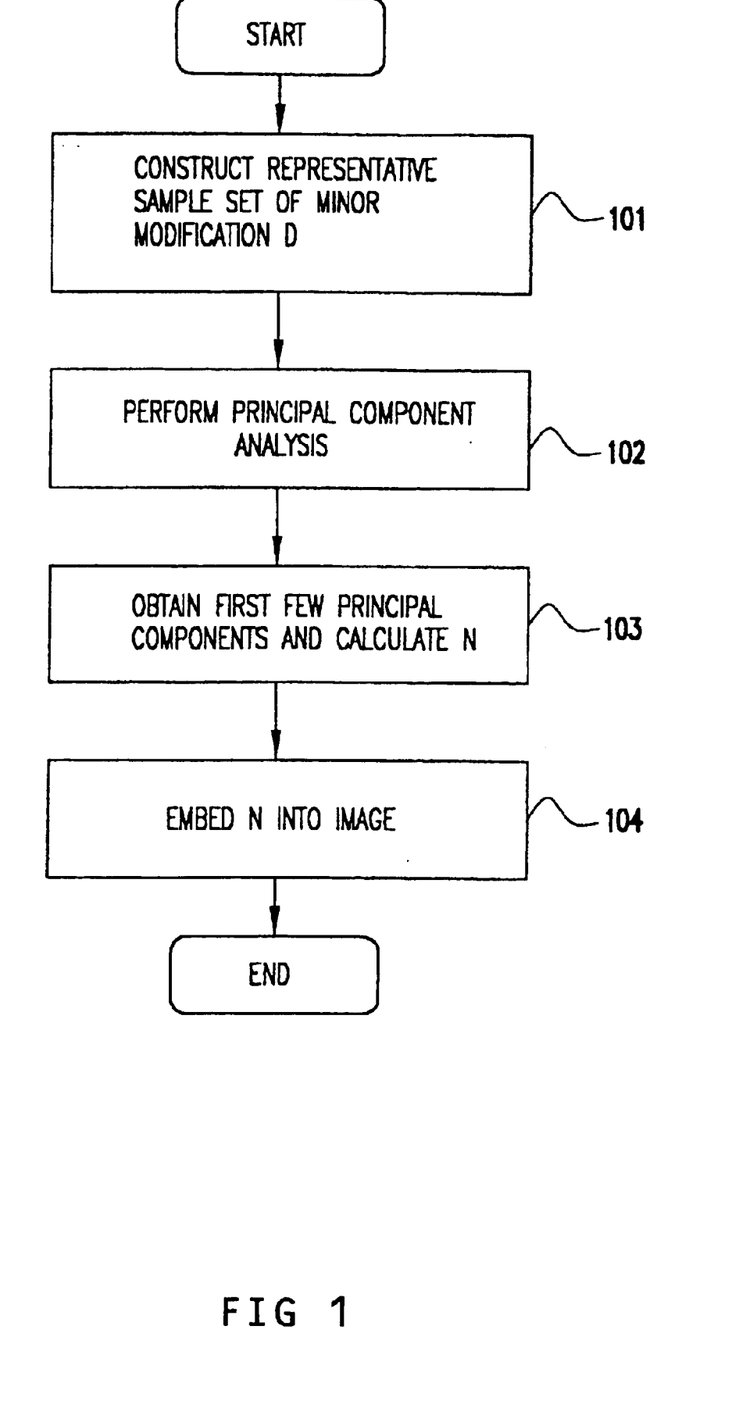
FIGS. 1 and 2 are flow diagrams illustrating the steps involved in applying a semi-fragile watermark according to a first embodiment of the present invention.
Figure 2:
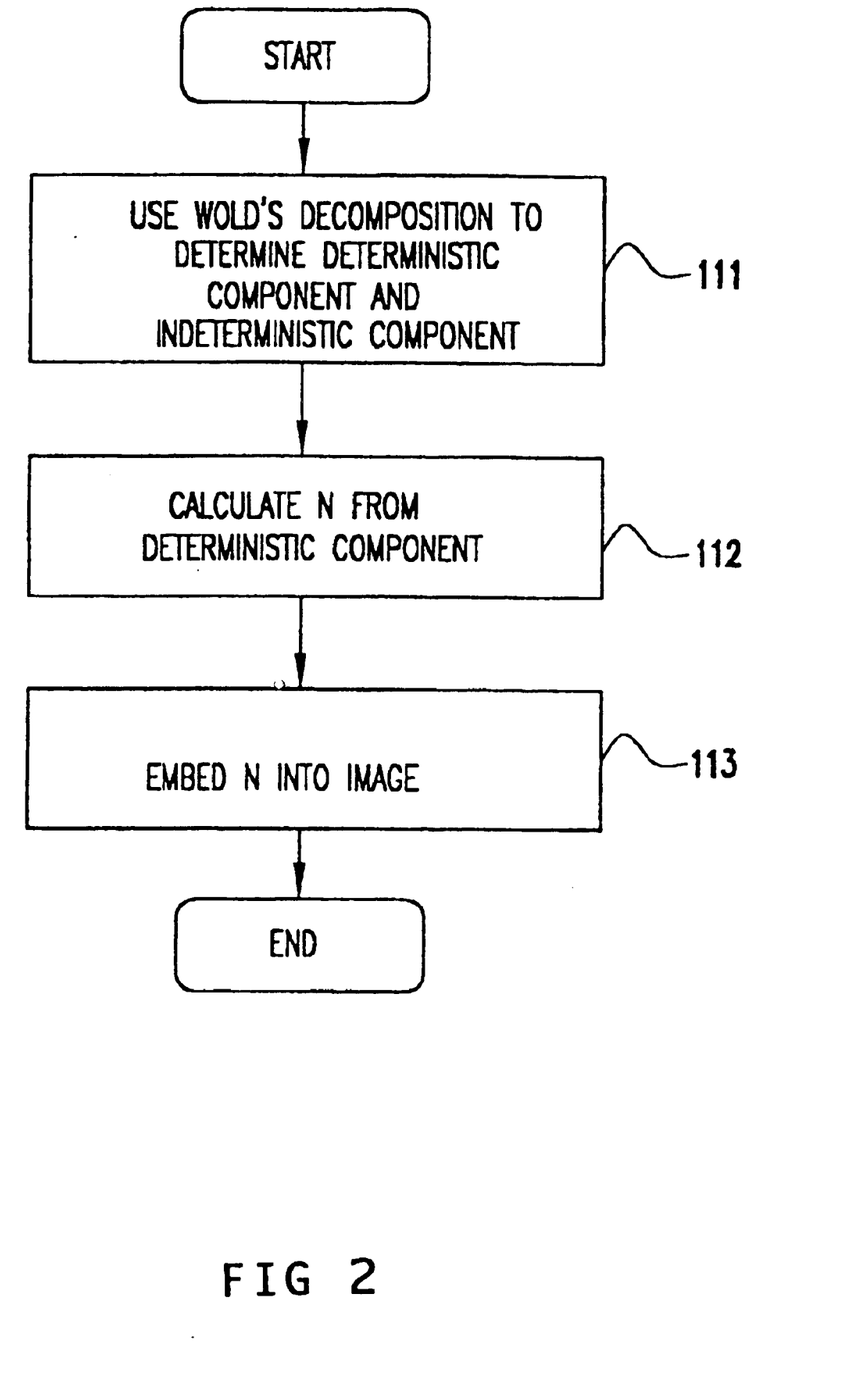

The image may be decomposed into the two components in a number of ways, two of which are described below which are illustrated in FIGS. 1 and 2, respectively.

Referring now to FIG. 1, the first way to decomposed the image into two components uses Principal Component Analysis (PCA). We assume that the image is described in terms of a vector I, of real or natural numbers. A large number of experiments on the known modifications, say printing and scanning, are conducted and suppose that the image I changes to I' after the experiment. The changes in the image D=I'-I, are noted for each experiment. From this large set of vectors D (101), we derive the covariance matrix R for the modification. Now principal component analysis, as described by I. T. Jolliffe, "*Principal Component Analysis*" Springer-Verlag, New York, 1986, (herein incorporated by reference) is performed on this covariance matrix (102). In principal component analysis, which is also known as eigen decomposition, the eigen-vectors of the matrix R are identified and the corresponding eigen-values are noted. An eigen-vector denotes a direction in the vector space and the eigen-value denotes the amount of energy in a typical difference vector D in that direction. A subset of the eigen-vectors define a subspace, such that any vector in the subspace is a linear combination of the eigen-vectors in the subset. The amount of energy contained in this subspace is the sum of corresponding eigen-values. Thus we can decompose the space into two sub-spaces or components such that one of them contains all the relatively large eigen-values, and is called the Principal component, and the other which is orthogonal to it, shall be called the orthogonal component. Let the eigen-vectors in the orthogonal component be stacked in the matrix K, then the projection of the difference vector D on the subspace K, K*D shall have almost zero energy. Thus $\|K*D\|=0$ or $\|K*(I-I')\|=0$ or $K*I=K*I'$. Thus after K is found for a given process, we derive the number N=F(1) (103) from K*I and the image I', modified by the process, shall give the same number N when calculated using K*I'. We use this number to watermark the image (104). Thus using this method we can do
the semi-fragile watermarking of the image, which can be modified by a known process, but results in the same watermark.

Referring now to FIG. 2, the second way to decomposed the image into two components uses "Wold's Decomposition", as described in A. Papoulis "*Predictable Processes and Wold's Decomposition*", IEEE Transactions on Acoustics, Speech and Signal Processing, vol. ASSP-33, 1985, herein incorporated by reference. The theory of Wold's Decomposition allows us to decompose any regular random process into two orthogonal components, the deterministic component and the purely indeterministic component (111). The method of Wold's Decomposition is applied in the image processing domain as described by J. M. Francos et al. "*A unified texture model based on a 2-D Wold-like decomposition*", IEEE Transactions on Signal Processing, pp. 2665–2678, August 1993, herein incorporated by reference. The modifications in the image which take place due to processes like printing and scanning or compression will be indeterministic and will occur in the purely indeterministic component of the image. On the other hand, deliberate modifications by a malicious user will change the deterministic component of the image. Thus, if we decompose the image I into deterministic and purely indeterministic components, and use only the deterministic component of the image to derive the number N=F(I)(112), this number would remain same if the image undergoes a benign modification process such as D/A conversion, but it will change if the deterministic component of the image is changed. While our first method of Principal Components was dependent on the kind of process, which the image would be subjected to in the future, the method of Wold's decomposition can be used irrespective of it. Moreover, using Wold's, we have no need of learning statistical properties of the modifications.

Some changes in the image due to these processes, are deterministic. For example, printing and scanning may modify the intensity or the contrast slightly over the complete image. This change may be deterministic, though the scanned image may still be acceptable. We can ignore these modifications in the image before applying the Wold's decompositions. So, for example, in this case, we scale the image to a particular average intensity value before decomposing it. The number N is then embedded into the image via a watermarking process (113).

Figure 3:
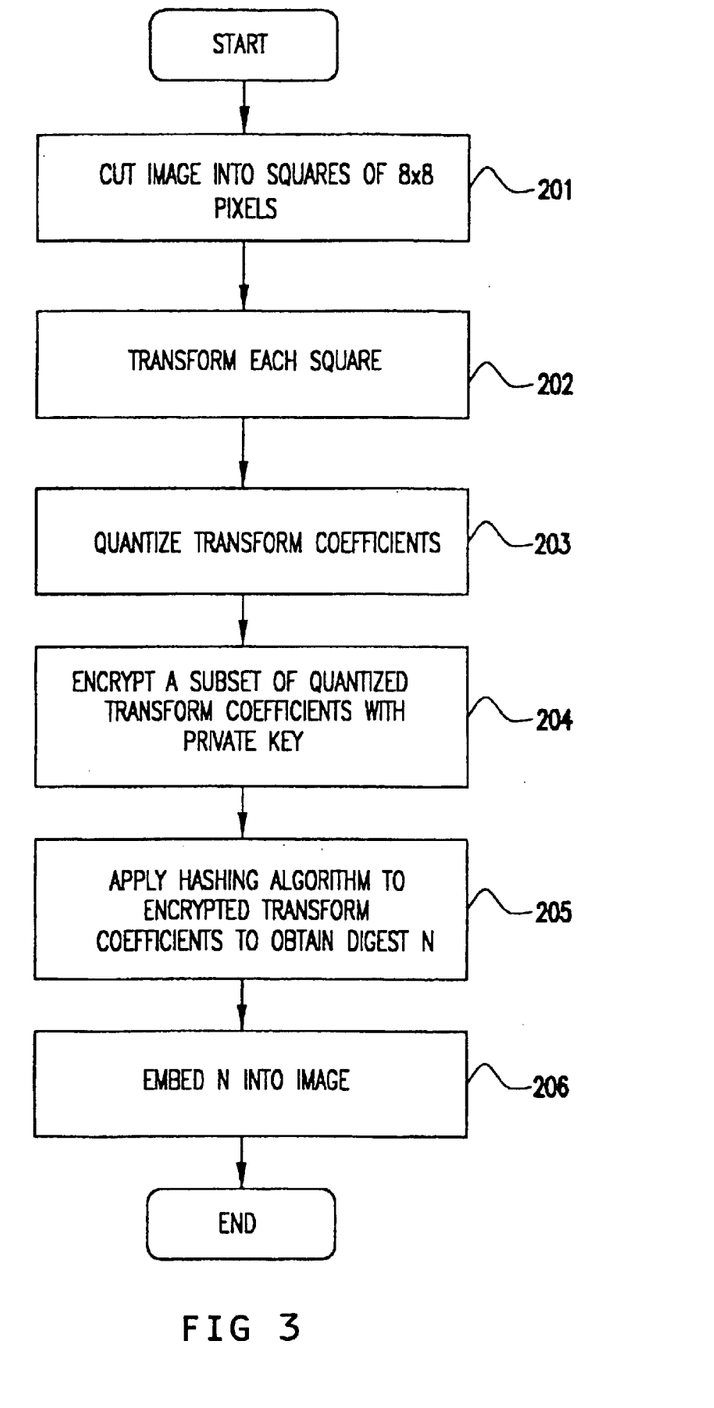
FIG. 3 shows a flow diagram illustrating the steps involved in applying a semi-fragile watermark according to a second embodiment of the present invention.

Referring now FIG. 3, the second method for calculating a semi-fragile watermark N is illustrated. In the second method, the image is transformed into a suitable domain and the transform coefficients quantized. The quantized coefficients is then used to construct N, the rest of the process remains the same as in the first method. We give below a specific preferred embodiment of this second method to gray scale images. First the image is cut up into squares, for example, squares of 8 pixels by 8 pixels (201). The discrete cosine transform (DCT) is computed for each square (202) and quantized according to a quantization table which can be taken from a JPEG algorithm with a low quality factor (203). An example of a JPEG table can be found in William B. Pennebaker, JPEG: still image data compression standard, Van Nostrand Reinhold, New York, 1993.

For each square some of the 64 quantized coefficients form a message which is then encrypted/scrambled with a private key into another message (204). All the encrypted messages are then hashed by the secure hash algorithm (SHA-1) into a 160 bit message or "digest" F(I) (205). This digest N=F(I) is then embedded into the image by a robust invisible watermark algorithm or other robust data hiding algorithm (206). The digest N can also be embedded in I as a visible watermark.

Figure 4:
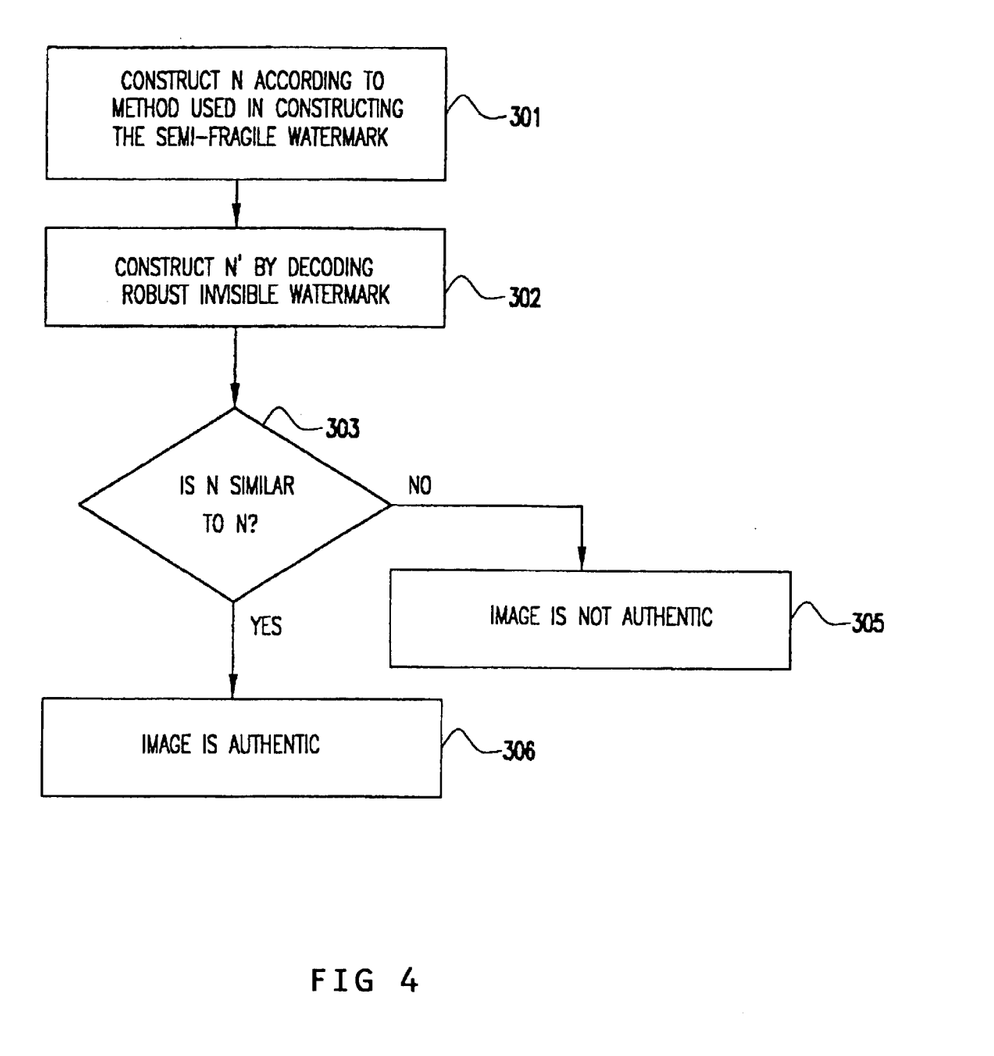
FIG. 4 is a flow diagram showing authenticating an image with a semi-fragile watermark.

Referring to FIG. 4, the watermark embedded in the file I' is extracted for authentication. As before a number N is constructed from I' according to the method used to calculate N initially for the original file I (301) and compared with the number N' extracted from the robust invisible watermark in the image I' (302). If the comparison (303) is good (e.g. >50% of the bits of N and N' are matched) then the image is authenticated (304). Otherwise, the image is not authentic (305).

Figure 5:
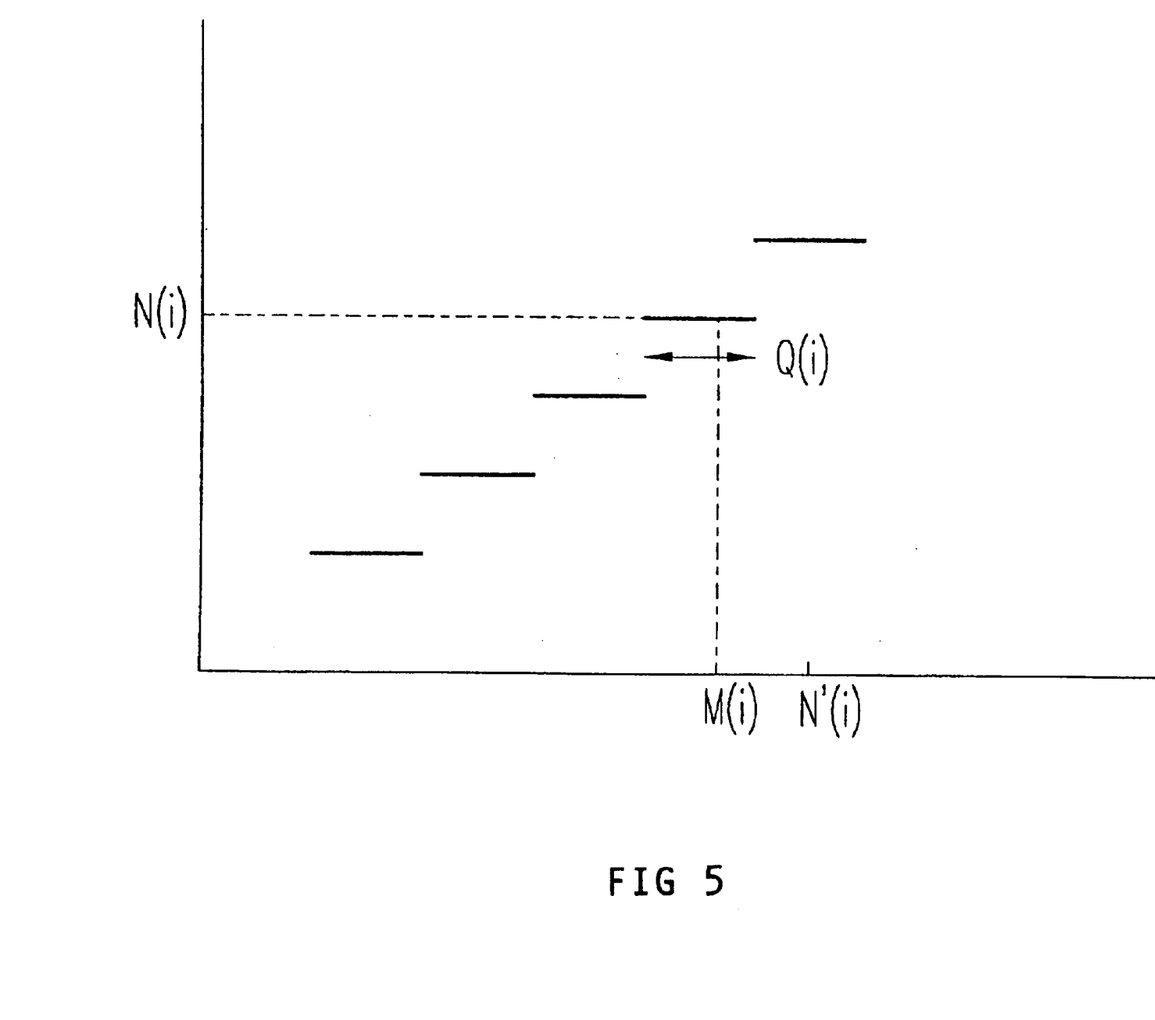
FIG. 5 is a diagram showing N(I) as a quantization of some DCT coefficient M(I) obtained from I and N'(D) which is the corresponding DCT coefficient in the image to be authenticated I'.
Figure 6:
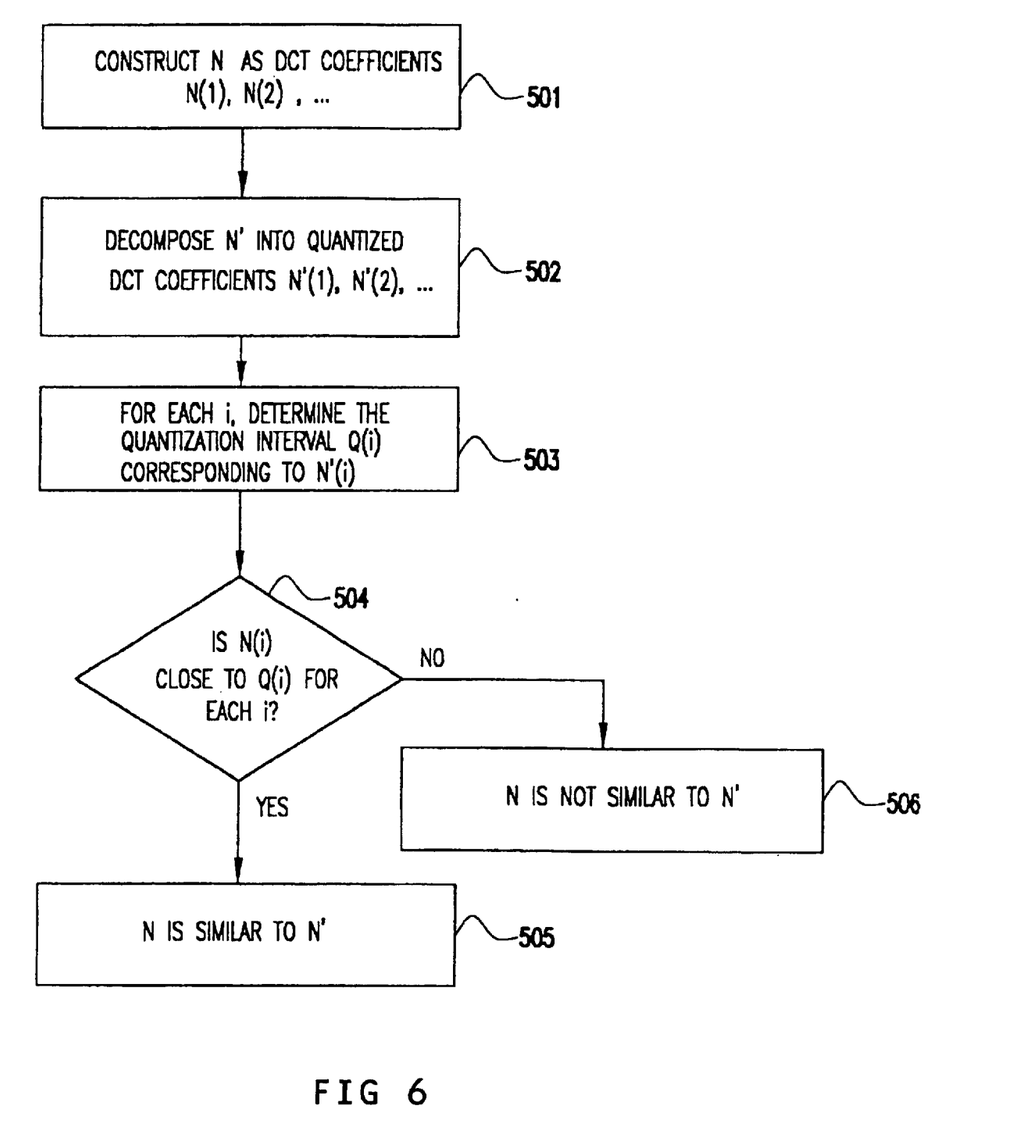
FIG. 6 is a flow diagram showing a second embodiment for authenticating an image with a semi-fragile watermark.

Alternatively, instead of comparing N' against a number N extracted from I', authentication can also be done by an algorithm which compares N' directly against I'. For instance, with reference to FIG. 5, suppose hashing is not used and N' as extracted from the watermark in I' has not been damaged, i.e., it is the same as F (I) calculated from the image I. Thus, N' is equal to the quantized DCT coefficients of some of the pixel blocks of I, i.e, N' is a collection of quantized DCT coefficients N'(1), N'(2), . . . , where each N'(I) is the quantization of some DCT coefficient M (I) obtained from I'. Each M (I) belongs to some quantization interval Q(I) with the property that every member of the set Q(I) will be mapped into N(1) by the quantization process. Then we authenticate the image by constructing N similarly as a collection of DCT coefficients N(1), N(2), . . . of blocks of I', and saying that N'(I) matches with N(I) if the distance between N'(I) and Q(I) as defined above is small. If all N'(I) matches with N(I), then the image is authentic. This alternate embodiment corresponds to block 303 in FIG. 4 being implemented as shown in FIG. 6. Note that in this embodiment, N(I) are DCT coefficients which are note quantized. Referring to the flow diagram of FIG. 6, in block 501 N is constructed as N(1), N(2), . . . . At block 502, N' is decomposed into N'(1), N'(2) . . . . At block 503, for each I, the quantization interval Q(I) corresponding to N'(I) is determined. At decision block 504, it is determined if N(I) is close to Q(I) for each I. If yes, then N is similar to N' and the image is authentic (block 505). If however, N is not similar to N', then the image is determined to be not authentic (Block 506).

To improve the robustness of the extracted number N against minor modifications, in second embodiment, the following additional step is added to the first phase to compute the number N:

After F(I) is computed according to one of the methods described above (i.e. principal component analysis, Wold's decomposition, or transform coding), the number F(I) is considered as a q-ary word (a number in base q) of a certain length. Let C be a predetermined q-ary error correcting code of that length. Then N is chosen as the codeword in C nearest to F(I). The reason for doing this is that even if F(I) is different from the original image and for the image after minor modifications, there is a high probability that A; their nearest Codeword in C, and therefore N, is the same.

Figure 7:
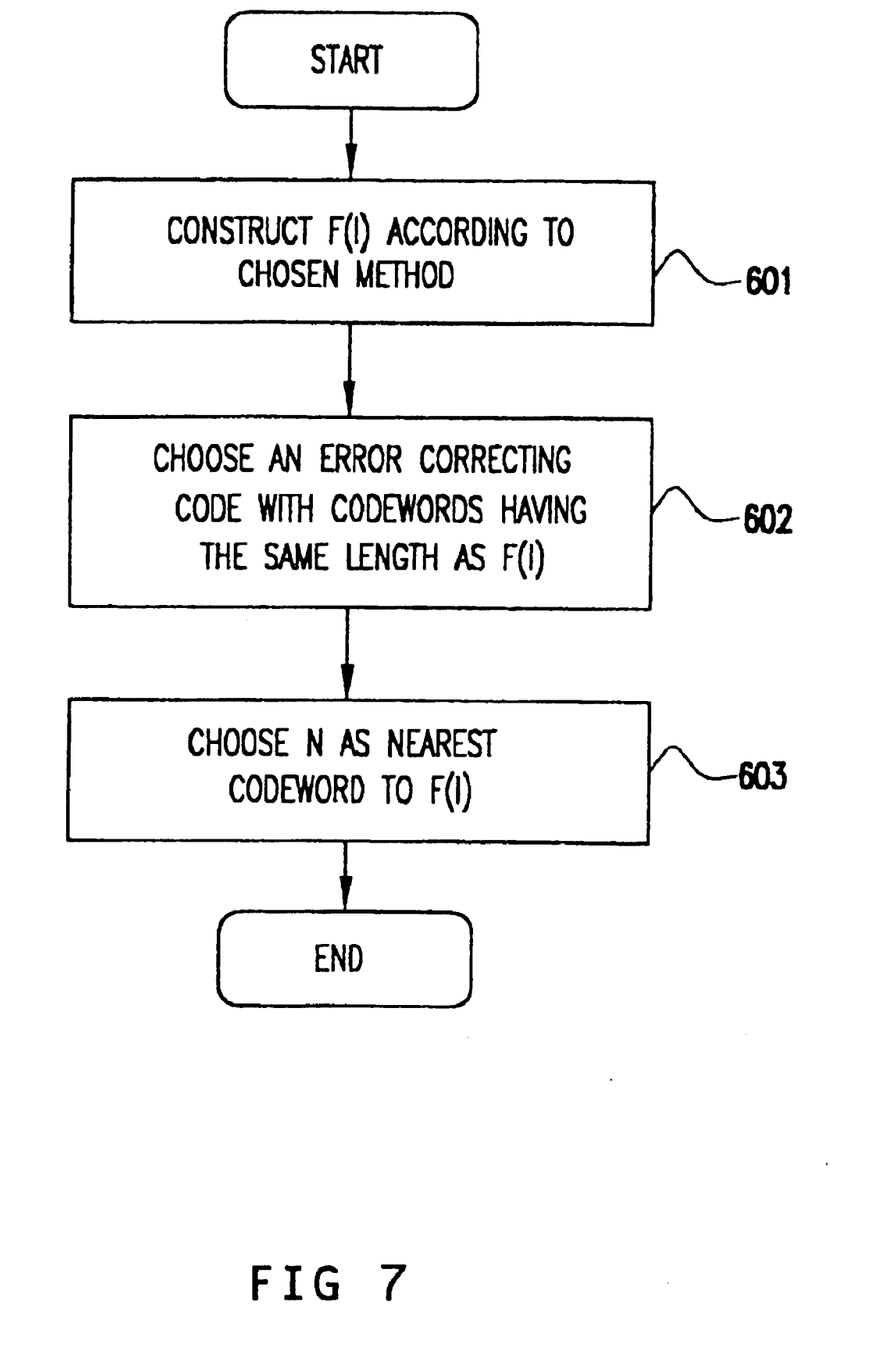
FIG. 7 is a flow diagram showing a method for constructing a watermark with an error correcting code.
Figure 8:
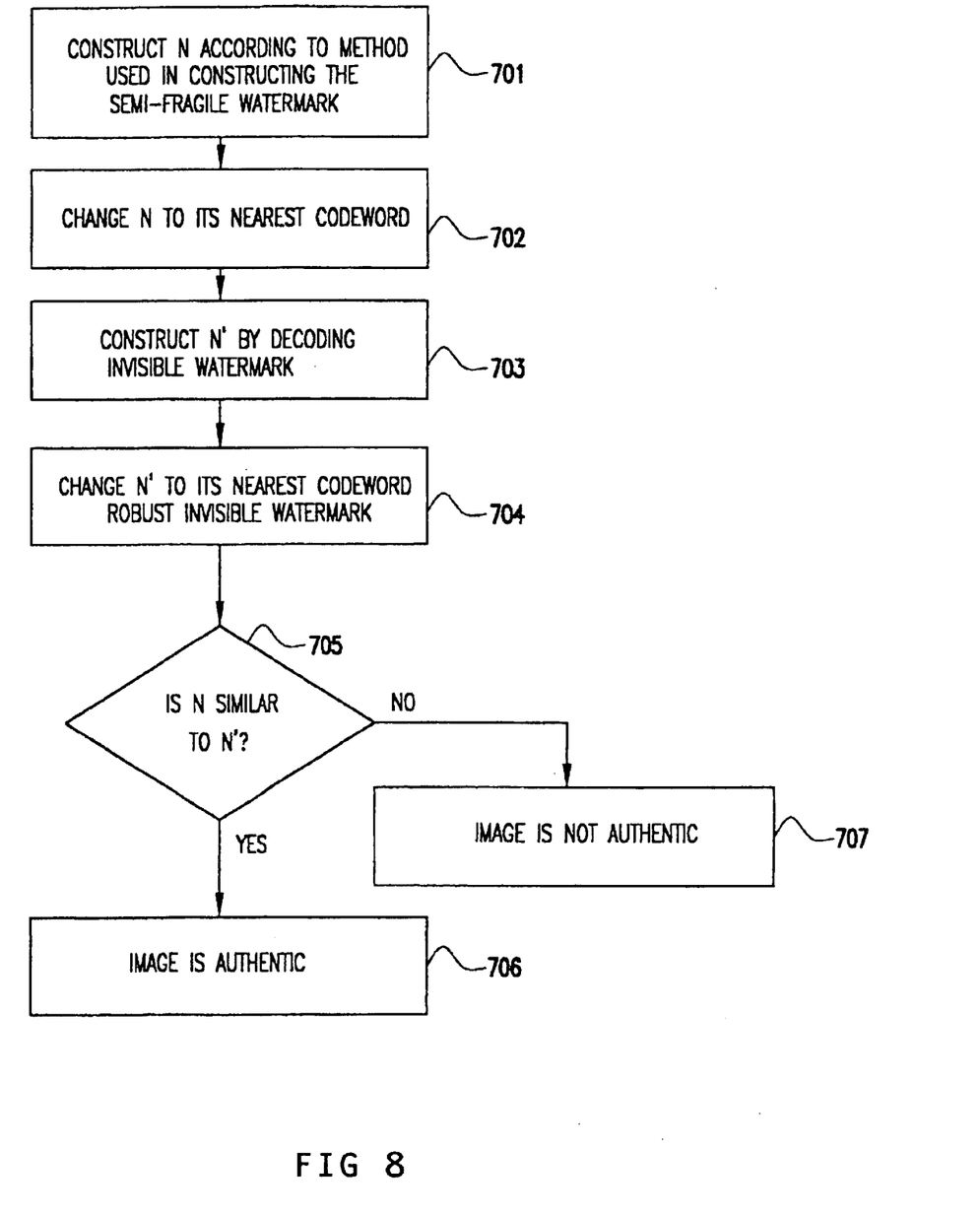
FIG. 8 is a flow diagram showing a method for authenticating a watermark with an error correcting code.

In this embodiment, to authenticate an image, the numbers N and N' extracted from the image are first converted to their corresponding nearest codewords before being compared to each other. The flow diagram to compute N and the flow diagram to authenticate the image in this embodiment is shown in FIGS. 7 and 8, respectively. Referring to FIG. 7, F(I) is constructed according to a chosen method (block 601). At block 602, an error correcting code is chosen having a same length as F(I). At block 603, N is chosen having the nearest codeword to F(I). Referring to FIG. 8, at block 701, N is constructed for a semi fragile watermark as described previously. At block 702 N is changed to the nearest code word. At block 703, N' is constructed by decoding robust invisible watermark. At block 704. N' is changed to the nearest codeword. At decision block 705 is determined whether N is similar to N'. If yes, block 706, then the image-is authentic. If no, block 707, the image is not authentic.

In yet another preferred embodiment, them image I is decomposed into overlapping larger squares and non-overlapping smaller squares and the number N is calculated from the overlapping larger squares and embedded into the corresponding non-overlapping smaller square. More details on this decomposition can be found in patent application Ser. No. 09/143,354, titled "Compressed image authentication and verification" filed on Aug. 28, 1998, where this technique of decomposition is used to implement a fragile watermark in compressed images. One skilled in the art can adapt the techniques in the aforementioned disclosure to the current invention.

We have described several methods to extract a number from an image so that the same number (or almost the same number in some applications) will be extracted from the image after inessential modifications. Further methods to do so are described in U.S. patent application Ser. No. 09/397, 503 filed on Sep. 17, 1999, METHOD AND APPARATUS FOR PRODUCING DUPLICATION- AND IMITATION-RESISTANT IDENTIFYING MARKS ON OBJECTS, AND DUPLICATION- AND IMITATION-RESISTANT OBJECTS by Nabil Amer et al.

Those skilled in the art will recognize that the invention can be practiced with modification within the spirit and scope of the appended claims.

We claim:

1. A method for watermarking an image file where benign modifications to the file still render the file authenticatible, comprising the steps of:

constructing a digest N from stable contents of the file which survives benign modifications but which is changed by modifications to significant content of the file;

embedding said digest N into the file with a watermark algorithm; and wherein said stable contents of the image file is determined by the steps:

constructing a class of images having statistical properties which are a representative subset of possible benign modifications to the image; and decomposing the image with said statistical properties into two components, a first of said two components comprising said benign modifications to said image and a second of said two components, being orthogonal to the first, comprising said stable contents.

2. A method for watermarking an image file as recited in claim 1 wherein said watermark algorithm is an invisible robust watermark algorithm.

3. A method for watermarking an image file as recited in claim 1 wherein said watermark algorithm is a visible robust watermark algorithm.

4. A method for watermarking an image file as recited in claim 1 wherein said benign modifications comprise printing the file and subsequently scanning the file.

5. A method for watermarking an image file as recited in claim 1 wherein said benign modifications comprise compressing and decompressing the file.

6. A method for watermarking an image file as recited in claim 1 wherein said digest is a hash of said second orthogonal component comprising and stable contents.

7. A method for watermarking an image file as recited in claim 1 wherein said step of decomposing the image comprises principle component analysis (PCA).

8. A method for watermarking an image file as recited in claim 1 wherein said step of decomposing the image comprises Wold's decomposition.

9. A method for watermarking an image where benign modifications to image file still render the file authenticatible, comprising the steps of:

cutting an image into squares of n×n pixels;

computing transform coefficients for each of said squares;

quantizing said transform coefficients according to a quantization table to produce quantized coefficients;

encrypting said quantized coefficients with a secret key;

hashing said encrypted quantized coefficients to obtain a digest N;

embedding said digest N in said image; and wherein authenticating said file comprises the steps of extracting said digest N from said image;

reconstructing a new digest N' from said from said image; and comparing said digest N to said new digest N', wherein a match indicates that said image is authentic.

10. A method for watermarking an image as recited in claim 9 wherein said transform coefficients comprise discrete cosine transform (DCT) coefficients.

11. A method for watermarking an image as recited in claim 9 wherein said match comprises at least 50% of bits in said digest N and said new digest N' being the same.

12. A method for watermarking an image as recited in claim 9 wherein reconstructing said new digest N' comprises the step of:

extracting and decoding the embedded watermark in said image.

13. A method for watermarking an image as recited in claim 9 wherein authenticating said file comprises the steps of:

extracting said digest N from said image;

reconstructing a new digest N' from said from said image;

decomposing said digest N into a collection of DCT coefficients N(1), N(2) . . . N(I);

decomposing said new digest N' into a collection of DCT coefficients N'(1), N'(2) . . . N'(I);

authenticating said image when N(I) matches N'(I) if the distance between N'(I) and a quantization interval Q(I) is small with the property that every member of Q(I) will be mapped into N(I).

14. A method for watermarking an image as recited in claim 13 wherein reconstructing said new digest N' comprises the step of:

extracting and decoding the embedded watermark in said image.

15. A method for watermarking an image as recited in claim 9 further comprising the steps:

considering said digest N as a q-ary word;

letting C be a q-ary error correcting code having a same length as said q-ary word;

changing said digest N be a codeword in C closest to said q-ary word.

16. A method for marking a file for authentication so that benign modifications to the file still render the file authenticatible, comprising the steps of:

constructing a digest N from stable contents of the file which survives benign modifications but which is changed by modifications to significant content of the file;

embedding encrypted second number computed out of said digest N into the file with a mark on the file; and wherein said stable contents of the image is determined by the steps:

constructing a class of images having statistical properties which are a representative subset of possible benign modifications to the image; and decomposing the image with said statistical properties into two components, a first of said two components comprising said benign modifications to said image and a second of said two components, being orthogonal to the first, comprising said stable contents.

17. A method for marking a file as recited in claim 16 wherein said encrypted second number is computed using the private part of a digital signature.

18. A method for marking a file as recited in claim 16 wherein said benign modifications comprise printing the file and subsequently scanning the file.

19. A method for marking a file as recited in claim 16 wherein said benign modifications comprise compressing and decompressing the file.

20. A method for marking a file as recited in claim 16 wherein said file is an image.

21. A method for marking a file as recited in claim 16 wherein said step of decomposing the image comprises principle component analysis (PCA).

22. A method for marking a file as recited in claim 16 wherein said step of decomposing the image comprises Wold's decomposition.

23. A method for marking an image as recited in claim 16 wherein authenticating said file comprises the steps of:

extracting said digest N from said image;

reconstructing a new digest N' from said image; and comparing said digest N to said new digest N', wherein a match indicates that said image is authentic.

24. A method for marking an image as recited in claim 23 wherein said match comprises at least 90% of bits in said digest N and said new digest N' being the same.

25. A method for marking an image as recited in claim 23 wherein authenticating said file comprises the steps of:

extracting said digest N from said image;

reconstructing a new digest N' from said image;

decomposing said digest N into a collection of DCT coefficients N(1), N(2) . . . N(I);

decomposing said new digest N' into a collection of DCT coefficients N'(1), N'(2) . . . N'(I);

authenticating said image when N(I) matches N'(I) if the distance between N(I) and a quantization interval Q(I) is small with the property that every member of Q(I) will be mapped into N'(I).

26. A method for watermarking an image as recited in claim 16 further comprising the steps:

considering said digest N as a q-ary word;

letting C be a q-ary error correcting code having a same length as said q-ary word;

changing said digest N be a codeword in C closest to said q-ary word.

27. A method for marking an image where benign modifications to the file still render the file authenticatible, comprising the steps of:

cutting an image into squares of n by n pixels;

computing transform coefficients for each of said squares;

quantizing said transform coefficients according to a quantization table to produce quantized coefficients;

encrypting said quantized coefficients with a secret key;

hashing said encrypted quantized coefficients to obtain a digest N; and embedding encrypted version of said digest N in said image.

28. A method for marking an image as recited in claim 27 wherein said transform coefficients comprise discrete cosine transform (DCT) coefficients.

* * * * *